US012718724B2

(12) United States Patent
Yu et al.

(10) Patent No.: US 12,718,724 B2
(45) Date of Patent: Aug. 25, 2026

(54) DISPLAY APPARATUS INCLUDING BLOCK CONTROL DRIVER AND ELECTRONIC APPARATUS INCLUDING THE SAME

(71) Applicant: Samsung Display Co., LTD., Yongin-si (KR)

(72) Inventors: Byungchang Yu, Yongin-si (KR); Kyungho Kim, Yongin-si (KR); Jinjoo Ha, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/070,907

(22) Filed: Mar. 5, 2025

(65) Prior Publication Data

US 2025/0363926 A1 Nov. 27, 2025

(30) Foreign Application Priority Data

May 24, 2024 (KR) ........................ 10-2024-0067641

(51) Int. Cl.
*G09G 3/20* (2006.01)

(52) U.S. Cl.
CPC ....... *G09G 3/20* (2013.01); *G09G 2300/0819* (2013.01); *G09G 2300/0842* (2013.01); *G09G 2300/0861* (2013.01); *G09G 2310/08* (2013.01); *G09G 2330/021* (2013.01)

(58) Field of Classification Search
CPC ............. G09G 3/20; G09G 2300/0819; G09G 2300/0842; G09G 2300/0861; G09G 2310/08; G09G 2330/021
See application file for complete search history.

(56) References Cited

U.S. PATENT DOCUMENTS

| | | | | |
|---|---|---|---|---|
| 2016/0055798 | A1* | 2/2016 | Song | G09G 3/3233 345/691 |
| 2018/0374425 | A1* | 12/2018 | Jeong | G06F 3/0412 |
| 2021/0134215 | A1* | 5/2021 | Chun | G09G 3/3233 |
| 2022/0293025 | A1* | 9/2022 | Lee | G09G 3/035 |

FOREIGN PATENT DOCUMENTS

| | | | |
|---|---|---|---|
| JP | 2023101235 | A | 7/2023 |
| JP | 2024010462 | A | 1/2024 |
| KR | 102023232 | B1 | 9/2019 |

* cited by examiner

*Primary Examiner* — Afroza Chowdhury
(74) *Attorney, Agent, or Firm* — CANTOR COLBURN LLP

(57) ABSTRACT

A display apparatus includes a display panel including a first display region and a second display region, a gate emission driver which outputs gate signals to the display panel, a data driver which applies a data voltage to the display panel and a block control driver which outputs block control signals to the display panel based on block control data. A driving frequency of the first display region is determined independently of a driving frequency of the second display region based on the block control signals. The block control driver receives the block control data sequentially, and outputs the block control signals in parallel.

20 Claims, 13 Drawing Sheets

DISPLAY APPARATUS INCLUDING BLOCK CONTROL DRIVER AND ELECTRONIC APPARATUS INCLUDING THE SAME

This application claims priority to Korean Patent Application No. 10-2024-0067641, filed on May 24, 2024, and all the benefits accruing therefrom under 35 U.S.C. § 119, the content of which in its entirety is herein incorporated by reference.

BACKGROUND

1. Field

Embodiments of the invention relate to a display apparatus and an electronic apparatus. More particularly, embodiments of the invention relate to a display apparatus and an electronic apparatus with reduced power consumption.

2. Description of the Related Art

Generally, a display apparatus includes a display panel and a display panel driver. The display panel may include a plurality of gate lines, a plurality of data lines, a plurality of emission lines and a plurality of pixels. The display panel driver may include a gate driver for providing a gate signal to the gate lines, a data driver for providing a data voltage to the data lines, an emission driver for providing an emission signal to the emission lines and a driving controller for controlling the gate driver, the data driver and the emission driver.

When an image displayed on the display panel is a static image or the display panel is operated in always on mode, a driving frequency of the display panel may be decreased to reduce a power consumption.

SUMMARY

When an image displayed on the display panel is a static image or the display panel is operated in always on mode, a driving frequency of the display panel may be decreased to reduce a power consumption.

Embodiments of the invention provide a display apparatus supporting a multiple division of a driving frequency to reduce a power consumption of the display apparatus.

Embodiments of the invention also provide an electronic apparatus including the pixel circuit.

According to embodiments, a display apparatus includes a display panel including a first display region and a second display region, a gate emission driver which outputs gate signals to the display panel, a data driver which applies a data voltage to the display panel and a block control driver which outputs block control signals to the display panel based on block control data. In such embodiments, a driving frequency of the first display region is determined independently of a driving frequency of the second display region based on the block control signals. In such embodiments, the block control driver receives the block control data sequentially, and outputs the block control signals in parallel.

In an embodiment, the display panel may include first to N-th block control lines, which output first to N-th block control signals, respectively, and first to N-th pixel-column. In such an embodiment, the first to N-th block control lines may be connected to the first to N-th pixel-column, respectively. In such an embodiment, N is a positive integer.

In an embodiment, the block control driver may include a block control signal convertor which receives the block control data and a block clock signal, and outputs converted block data based on the block control data and the block clock signal, and a block control signal outputter which receives the converted block data and outputs the block control signals based on block output signal.

In an embodiment, the data driver may generate the data voltage based on a horizontal start signal. In such an embodiment, the block control driver may generate the block control signals based on the horizontal start signal. In such an embodiment, the block output signal may be synchronized to the horizontal start signal.

In an embodiment, after the block output signal may have an inactivation level from an activation level, the horizontal start signal may have an activation level.

In an embodiment, the block control signal convertor may include a sequential block signal converting block which receives a block start signal and the block clock signal, and outputs a sequential block signal based on the block start signal and the block clock signal, and a sampling block which outputs the converted block data based on the block control data and the sequential block signal.

In an embodiment, the block signal converting block may include a first latch circuit. In such an embodiment, the first latch circuit may include an input terminal which receives the block start signal, a clock terminal which receives the block clock signal, and an output terminal which outputs the sequential block signal.

In an embodiment, the sampling block may include a second latch circuit. In such an embodiment, the second latch circuit may include an input terminal which receives the block control data, a clock terminal which receives the sequential block signal, and an output terminal which outputs the converted block data.

In an embodiment, the block control signal outputter may include a third latch circuit. In such an embodiment, the third latch circuit may include an input terminal which receives the converted block data, a clock terminal which receives the block output signal, and an output terminal which outputs the block control signals.

In an embodiment, the display panel may include a first pixel-column group, a second pixel-column group and a third pixel-column group. In such an embodiment, the block control signals may include a first group block control signal, a second group block control signal and a third group block control signal. In such an embodiment, the first group block control signal may be outputted to the first pixel-column group, the second group block control signal may be outputted to the second pixel-column group, and the third group block control signal may be outputted to the third pixel-column group.

In an embodiment, the block control driver may include a sequential block signal converting block which receives a block start signal and a block clock signal, and outputs a sequential block signal based on the block start signal and the block clock signal, a sampling block which outputs the converted block data based on the block control data and the sequential block signal, a holding block which receives the converted block data, and generate the first group block control signal, the second group block control signal and the third group block control signal based on a block output signal and an output block which outputs the first group block control signal to a first pixel-column, outputs the second group block control signal to a second pixel-column, and outputs the third group block control signal to a third pixel-column.

In an embodiment, the second display region may be located adjacent to the first display region in a first direction. In such an embodiment, the display panel may be located spaced apart from the data driver in a second direction different from the first direction.

In an embodiment, the display panel may include a gate line which outputs the gate signals, a data line which outputs the data voltage and a block control line which outputs the block control line. In such an embodiment, the gate line may extend in a first direction, the data line may extend in a second direction different from the first direction, and the block control line may extend in the second direction.

According to embodiments, a display apparatus includes a display panel including a pixel circuit, a gate emission driver which outputs gate signals to the display panel, a data driver which applies a data voltage to the display panel, and a block control driver which outputs a block control signal to the display panel based on block control data. In such embodiments, the pixel circuit may include a driving transistor which generates a driving current based on the data voltage, a writing transistor which performs a data writing operation by applying the data voltage to the driving transistor in response to a write gate signal, an initialization transistor which performs an initialization operation by applying an initialization voltage to the driving transistor in response to an initialization gate signal, and a block control transistor which controls the writing operation and the initialization operation in response to the block control signal. In such embodiments, the block control driver receives the block control data sequentially, and outputs the block control signal in parallel.

In an embodiment, the block control driver may include a block control signal convertor which receives the block control data and a block clock signal, and outputs converted block data based on the block control data and the block clock signal, and a block control signal outputter which receives the converted block data and outputs the block control signal based on block output signal.

In an embodiment, the block control signal convertor may include a sequential block signal converting block which receives a block start signal and the block clock signal, and outputs a sequential block signal based on the block start signal and the block clock signal, and a sampling block which outputs the converted block data based on the block control data and the sequential block signal.

In an embodiment, the block signal converting block may include a first latch circuit. In such an embodiment, the first latch circuit may include an input terminal which receives the block start signal, a clock terminal which receives the block clock signal, and an output terminal which outputs the sequential block signal.

In an embodiment, the sampling block may include a second latch circuit. In such an embodiment, the second latch circuit may include an input terminal which receives the block control data, a clock terminal which receives the sequential block signal, and an output terminal which outputs the converted block data.

In an embodiment, the block control signal outputter may include a third latch circuit. In such an embodiment, the third latch circuit may include an input terminal which receives the converted block data, a clock terminal which receives the block output signal, and an output terminal which outputs the block control signal.

In an embodiment, a period, in which the pixel circuit is driven, may include an address period, in which the pixel circuit emit light based on a data voltage of a present frame, and a self-scan period, in which the pixel circuit emit light based on a data voltage of a previous frame. In such an embodiment, in the address period, the block control signal may have an activation level, and the block control transistor may be turned on.

According to embodiments, an electronic apparatus includes a display panel including a first display region and a second display region, a gate emission driver which outputs gate signals to the display panel, a data driver which applies a data voltage to the display panel, a block control driver which outputs block control signals to the display panel based on block control data, a driving controller which controls the gate emission driver, the data driver and the block control driver based on an input control signal, and a processor which outputs the input control signal. In such embodiments, a driving frequency of the first display region is determined independently of a driving frequency of the second display region based on the block control signals. In such embodiments, the block control driver receives the block control data sequentially, and outputs the block control signals in parallel.

In an embodiment, the display panel may include first to N-th block control lines, which output first to N-th block control signals, respectively, and first to N-th pixel-column. In such an embodiment, the first to N-th block control lines may be connected to the first to N-th pixel-column, respectively. In such an embodiment, N is a positive integer.

In embodiments of the invention, as described above, a writing operation and an initialization operation of the pixel circuit may be controlled based on a block control signal. Accordingly, a display apparatus may support the multiple division of the driving frequency.

In such embodiments, through the multiple division of the driving frequency, a power consumption of the display apparatus may be effectively reduced.

In such embodiments, the block control driver may change from the block control data which are serial data to the block control signal which is parallel-data. When the display panel may be driven as a horizontal multiple division of the driving frequency, the block control signal may be parallel-data, such that a power consumption of the display apparatus may be reduced.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
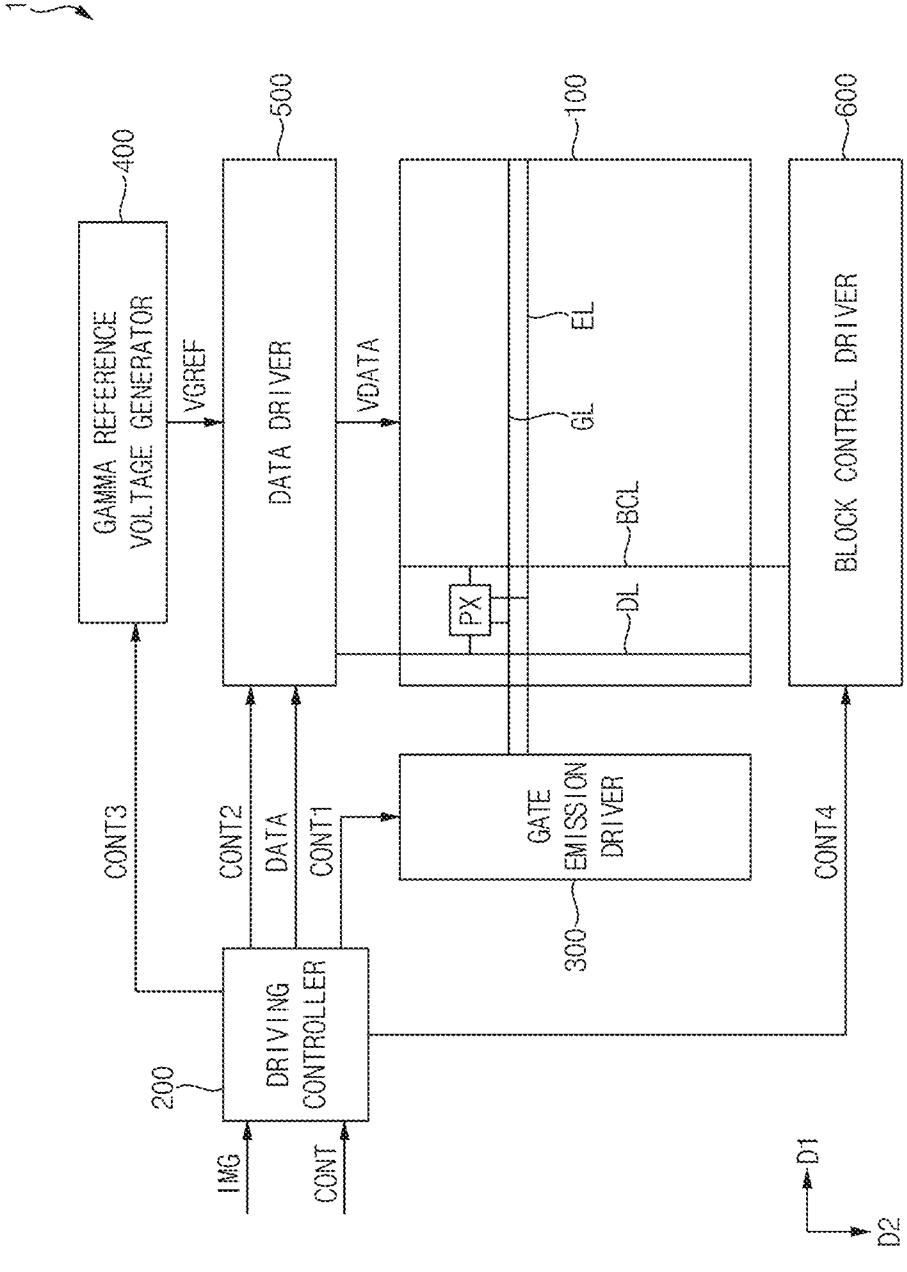
FIG. 1 is a block diagram illustrating a display apparatus according to embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being “on” another element, it can be directly on the other element or intervening elements may be present therebetween. In contrast, when an element is referred to as being “directly on” another element, there are no intervening elements present.

It will be understood that, although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, “a first element,” “component,” “region,” “layer” or “section” discussed below could be termed a second element, component, region, layer or section without departing from the teachings herein.

The terminology used herein is for the purpose of describing particular embodiments only and is not intended to be limiting. As used herein, “a”, “an,” “the,” and “at least one” do not denote a limitation of quantity, and are intended to include both the singular and plural, unless the context clearly indicates otherwise. Thus, reference to “an” element in a claim followed by reference to “the” element is inclusive of one element and a plurality of the elements. For example, “an element” has the same meaning as “at least one element,” unless the context clearly indicates otherwise. “At least one” is not to be construed as limiting “a” or “an.” “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The term “lower,” can therefore, encompasses both an orientation of “lower” and “upper,” depending on the particular orientation of the figure. Similarly, if the device in one of the figures is turned over, elements described as “below” or “beneath” other elements would then be oriented “above” the other elements. The terms “below” or “beneath” can, therefore, encompass both an orientation of above and below.

“About” or “approximately” as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display apparatus 1 according to embodiments of the invention.

Referring to FIG. 1, an embodiment of the display apparatus 1 may include a display panel 100 and a display panel driver. The display panel driver may include a driving controller 200, a gate emission driver 300, a gamma reference voltage generator 400, a data driver 500 and block control driver 600.

The display panel 100 may include a display region, on which an image is displayed, and a peripheral region adjacent to the display region.

The display panel 100 may include a plurality of gate lines GL, a plurality of data lines DL, a plurality of emission lines EL, a plurality of block control lines BCL and a plurality of pixel circuits PX electrically connected to the gate lines GL, the data lines DL, the emission lines EL and the block control lines BCL. The gate lines GL may extend in a first direction D1. The data lines DL may extend in a second direction D2 crossing the first direction D1. The emission lines EL may extend in the first direction D1. The block control lines BCL may extend in the second direction D2.

The driving controller 200 may receive input image data IMG and an input control signal CONT from an external apparatus. In an embodiment, for example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, a fourth control signal CONT4 and a data signal DATA based on the input image data IMG and the input control signal CONT.

The driving controller 200 may generate the first control signal CONT1 for controlling an operation of the gate emission driver 300 based on the input control signal CONT, and output the first control signal CONT1 to the gate emission driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the block control driver 600 based on the input control signal CONT, and output the fourth control signal CONT4 to the block control driver 600. The fourth control signal CONT4 may include block control data BCDATA (shown in FIG. 4), a block start signal STP (shown in FIG. 6), a block clock signal BCLK (shown in FIG. 4), a block output signal LD (shown in FIG. 6) and the horizontal start signal.

The gate emission driver 300 may generate gate signals for driving the gate lines GL in response to the first control signal CONT1 received from the driving controller 200. The gate emission driver 300 may generate emission signals EM of FIG. 4 for driving the emission lines EL in response to the first control signal CONT1 received from the driving controller 200. The gate emission driver 300 may output the gate signals to the gate lines GL. The gate emission driver 300 may output the emission signal to the emission line EL. In an embodiment, for example, the gate signals may include an initialization gate signal GI (shown in FIG. 4), a write gate signal GW (shown in FIG. 4), a compensation gate signal GC (shown in FIG. 4) and a bias gate signal GB (shown in FIG. 4).

In an embodiment, the gate emission driver 300 may be integrated (or integrally formed) in the peripheral region. In an embodiment, the gate emission driver 300 may be disposed in the peripheral region.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to a level of the data signal DATA.

In an embodiment, the gamma reference voltage generator 400 may be disposed in the driving controller 200, or in the data driver 500.

The data driver 500 may receive the second control signal CONT2 and the data signal DATA from the driving controller 200, and receive the gamma reference voltages VGREF from the gamma reference voltage generator 400. The data driver 500 may convert the data signal DATA into data voltages having an analog type using the gamma reference voltages VGREF. The data driver 500 may output the data voltages to the data lines DL.

In an embodiment, the data driver 500 may be integrated in the peripheral region. In an embodiment, the data driver 500 may be disposed in the peripheral region.

Figure 4:
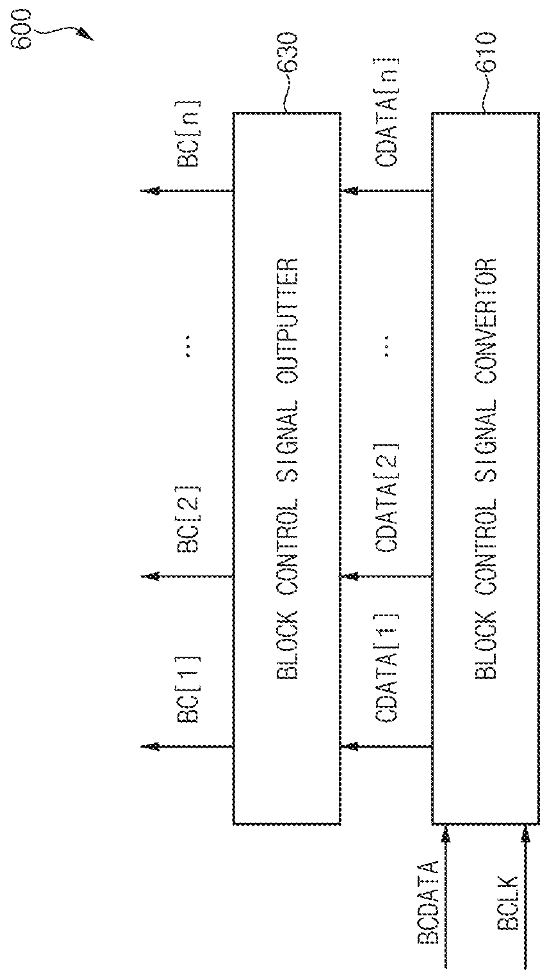
FIG. 4 is a block diagram illustrating an embodiment of a block control driver of FIG. 1.

The block control driver 600 may generate a block control signal BC of FIG. 4 in response to the first control signal CONT1 received from the driving controller 200. The block control driver 600 may output the block control signal BC of FIG. 4 to the display panel.

In an embodiment, the block control driver 600 may be integrated in the peripheral region. In an embodiment, the block control driver 600 may be disposed in the peripheral region.

Figure 2:
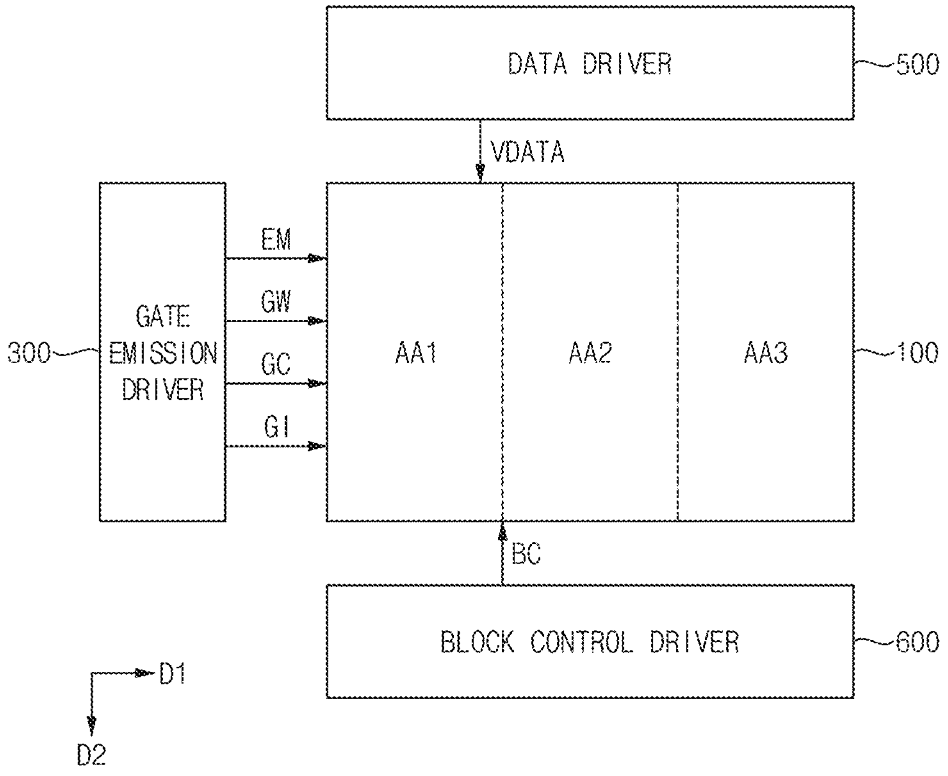
FIG. 2 is a block diagram illustrating a display panel, a gate emission driver, a data driver and a block control driver of FIG. 1.

FIG. 2 is a block diagram illustrating a display panel 100, a gate emission driver 300, a data driver 500 and a block control driver 600 of FIG. 1.

Referring to FIG. 1 and FIG. 2, an embodiment of the display panel 100 may include a first display region AA1, a second display region AA2 and a third display region AA3. In an embodiment, for example, the display region of the display panel 100 may include the first display region AA1, the second display region AA2 and the third display region AA3.

The first display region AA1 may be located spaced apart from the gate emission driver 300 in the first direction D1. The second display region AA2 may be located adjacent to the first display region AA1 in the first direction D1. The third display region AA3 may be located adjacent to the second display region AA2 in the first direction D1. A driving frequency of the first display region AA1, a driving frequency of the second display region AA2 and a driving frequency of the third display region AA3 may be different from each other. In an embodiment, for example, the first display region AA1 may emit as a first driving frequency. In an embodiment, for example, the second display region AA2 may emit as the first driving frequency. In an embodiment, for example, the second display region AA2 may emit as a second driving frequency different from the first driving frequency. In an embodiment, for example, the first driving frequency may be about 1 hertz (Hz). In an embodiment, for example, the second driving frequency may be about 120 Hz. However, the invention is not limited to a value of the driving frequency.

The driving frequency of the first display region AA1 may be inconsistent with (or determined independently of) the driving frequency of the second display region AA2, such that the display panel 100 may support the multiple division of the driving frequency. The display panel 100 may support the multiple division of the driving frequency, such that a power consumption of the display apparatus 1 may be reduced. In an embodiment, for example, display panel 100 may support the horizontal multiple division of the driving frequency.

Figure 3:
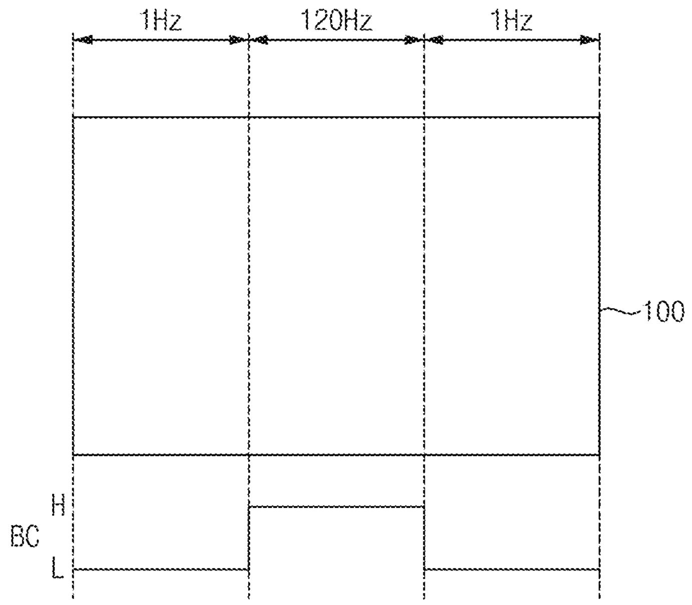
FIG. 3 is a conceptual diagram illustrating a block control signal outputted from a block control driver of FIG. 1 according to driving frequencies of portions of the display panel of FIG. 1.

FIG. 3 is a conceptual diagram illustrating a block control signal BC outputted from a block control driver 600 of FIG. 1 according to driving frequencies of portions of the display panel 100 of FIG. 1.

Referring to FIG. 1 to FIG. 3, in an embodiment, the pixel circuit PX may include a driving transistor, a writing transistor, an initialization transistor and a block control transistor.

The driving transistor may generate a driving current based on the data voltage. The writing transistor may apply the data voltage VDATA to the driving transistor in response to the write gate signal. In an embodiment, for example, an operation which the writing transistor applies the data voltage VDATA to the driving transistor may be called as a data writing operation. The initialization transistor may apply an initialization voltage to the driving transistor in response to the initialization gate signal. In an embodiment, example, an operation which the initialization transistor applies the initialization voltage to the driving transistor may be called as an initialization operation. The block control transistor may control the writing operation and the initialization operation in response to the block control signal BC.

In an embodiment, example, the block control tr may control a voltage applied to a control electrode of the driving transistor. In an embodiment, example, an activation level of the block control signal BC may be a high level H. In an embodiment, example, an inactivation level of the block control signal BC may be a low level L.

In an embodiment, example, when the block control transistor is turned on in response to the block control signal BC, a voltage may apply to the control electrode of the driving transistor. Accordingly, the voltage of the control electrode of the driving transistor may be changed.

In an embodiment, example, when the block control transistor is turned off in response to the block control signal BC, a voltage may not apply to the control electrode of the driving transistor. Accordingly, the voltage of the control electrode of the driving transistor may be maintained.

The pixel circuit PX may emit light as a high frequency (e.g., about 120 Hz) for a portion of the display panel 100 where a high frequency driving is necessary, and may emit light as a low frequency (e.g., about 1 Hz) for a portion of the display panel 100 where a low frequency driving is necessary, based on the block control signal BC.

In an embodiment, example, when the display panel 100 emits light as the high frequency, the block control signal BC may have an activation level. The block control transistor may be turned on. Accordingly, the pixel circuit PX may emit light based on a data voltage of a present frame.

In an embodiment, example, when the display panel 100 emits light as the low frequency, the block control signal BC may have an inactivation level, and the block control transistor may be turned off. Accordingly, the initialization operation and the data writing operation may not be performed. The initialization operation and the data writing operation may not be performed, such that the pixel circuit PX may emit light based on a data voltage of a previous frame.

FIG. 4 is a block diagram illustrating an embodiment of a block control driver 600 of FIG. 1.

Referring to FIG. 1 to FIG. 4, an embodiment of the block control driver may include a block control signal convertor 610 and a block control signal outputter 630. In an embodiment, the block control driver 600 may receive the block control data BCDATA sequentially. The block control driver 600 may output a block control signal BCLK in parallel.

The block control signal convertor 610 may receive the block control data BCDATA and the block clock signal BCLK. The block control signal convertor 610 may output converted block data CDATA[1], CDATA[2] to CDATA[n] based on the block control data BCDATA and the block clock signal BCLK. In an embodiment, the block control signal convertor 610 may receive the block control data BCDATA sequentially. In an embodiment, for example, the block control data BCDATA may be serial data. In an embodiment, for example, the converted block data CDATA [1], CDATA[2] to CDATA[n] may be parallel-data.

The block control signal outputter 630 may receive the converted block data CDATA[1], CDATA[2] to CDATA[n]. The block control signal outputter 630 may output block control signals BC[1], BC[2] to BC[n] based on the block output signal LD (shown in FIG. 6). In an embodiment, for example, the block control signal outputter 630 may convert the block control data BCDATA to the block control signals BC[1], BC[2] to BC[n] in response to the block output signal LD (shown in FIG. 6). In an embodiment, for example, the block control signals BC[1], BC[2] to BC[n] may be parallel-data.

In an embodiment, for example, the data voltage VDATA may be applied to pixel-rows sequentially. In an embodiment, for example, the data voltage VDATA may be changed sequentially on a pixel-row-by-pixel-row basis. In an embodiment, for example, the block control signal BC may be applied to pixel-rows sequentially. In an embodiment, for example, the block control signal BC may be changed sequentially on a pixel-row-by-pixel-row basis.

In an embodiment, the block control driver 600 may change from the block control data BCDATA, which are serial data, to the block control signal BC. When the display panel 100 may be driven as a horizontal multiple division of the driving frequency, the block control signal BC may be parallel-data, such that a power consumption of the display apparatus 1 may be reduced.

Figure 5:
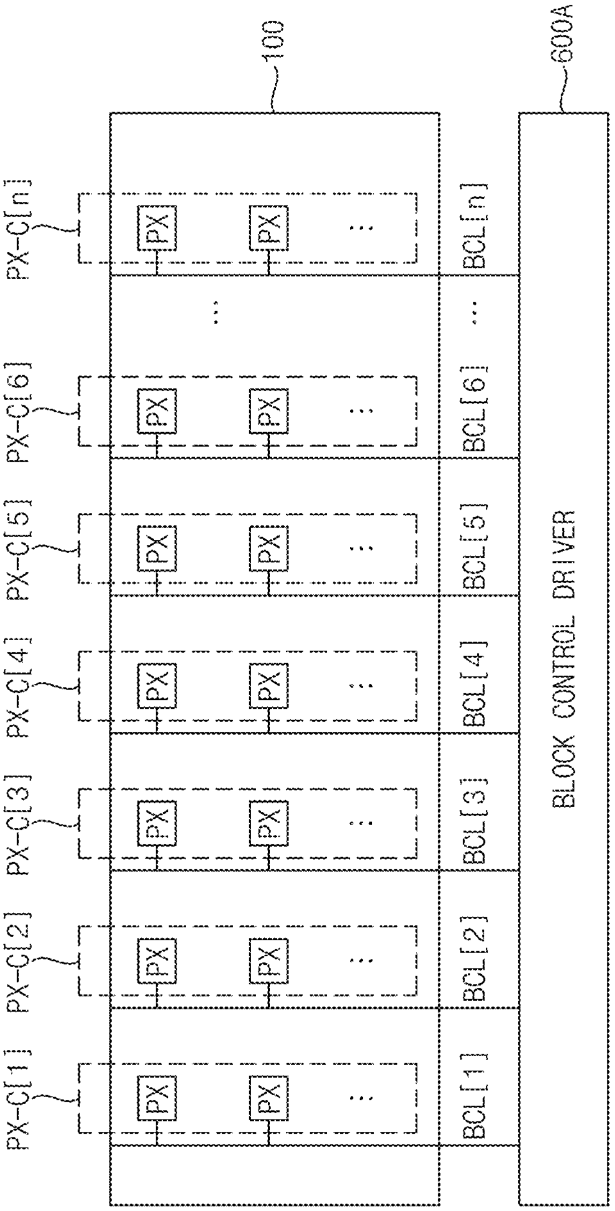
FIG. 5 is a block diagram illustrating a display panel and a block control driver of FIG. 1.

FIG. 5 is a block diagram illustrating a display panel 100 and a block control driver 600 of FIG. 1.

Referring to FIG. 1 to FIG. 5, the display panel may include first to N-th pixel-columns PX-C[1], PX-C[2], PX-C [3], PX-C[4], PX-C[5], PX-C[6] to PX-C[n]. Herein, N may be a positive integer. The pixel-column PX-C[n] may be the pixel circuits PX which is commonly connected to one of the block control lines BCL[1], BCL[2], BCL[3], BCL[4], BCL [5], BCL[6] to BCL[n]. In an embodiment, for example, the first pixel-column PX-C[1] may be connected to the first block control line BCL[1]. The first block control line BCL[1] may output a first block control signal among the block control signals BC[1], BC[2] to BC[n]. In an embodiment, for example, the second pixel-column PX-C[2] may be connected to the second block control line BCL[2]. The second block control line BCL[2] may output a second block control signal among the block control signals BC[1], BC[2] to BC[n]. In an embodiment, for example, the third pixel-column PX-C[3] may be connected to the third block control line BCL[3]. The third block control line BCL[3] may output a third block control signal among the block control signals BC[1], BC[2] to BC[n]. In an embodiment, for example, the fourth pixel-column PX-C[4] may be connected to the fourth block control line BCL[4]. The fourth block control line BCL[4] may output a fourth block control signal among the block control signals BC[1], BC[2] to BC[n]. In an embodiment, for example, the fifth pixel-column PX-C[5] may be connected to the fifth block control line BCL[5]. The fifth block control line BCL[5] may output a fifth block control signal among the block control signals BC[1], BC[2] to BC[n]. In an embodiment, for example, the sixth pixel-column PX-C[6] may be connected to the sixth block control line BCL[6]. The sixth block control line BCL[6] may output a sixth block control signal among the block control signals BC[1], BC[2] to BC[n]. In an embodiment, for example, the N-th pixel-column PX-C[n] may be connected to the N-th block control line BCL[n]. The N-th block control line BCL[n] may output an N-th block control signal among the block control signals BC[1], BC[2] to BC[n].

Figure 6:
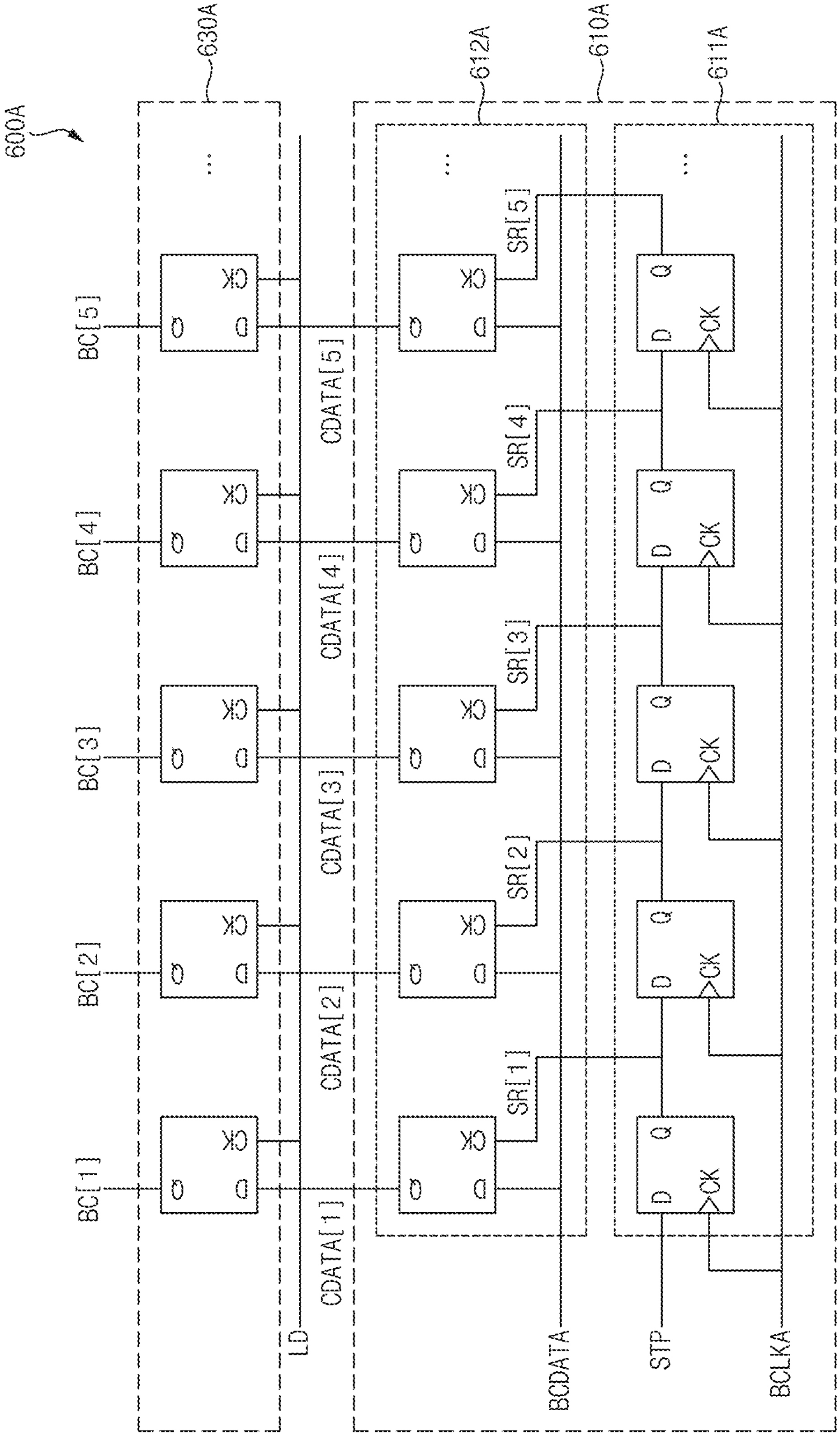
FIG. 6 is a circuit diagram illustrating an embodiment of a block control driver of FIG. 1.
Figure 7:
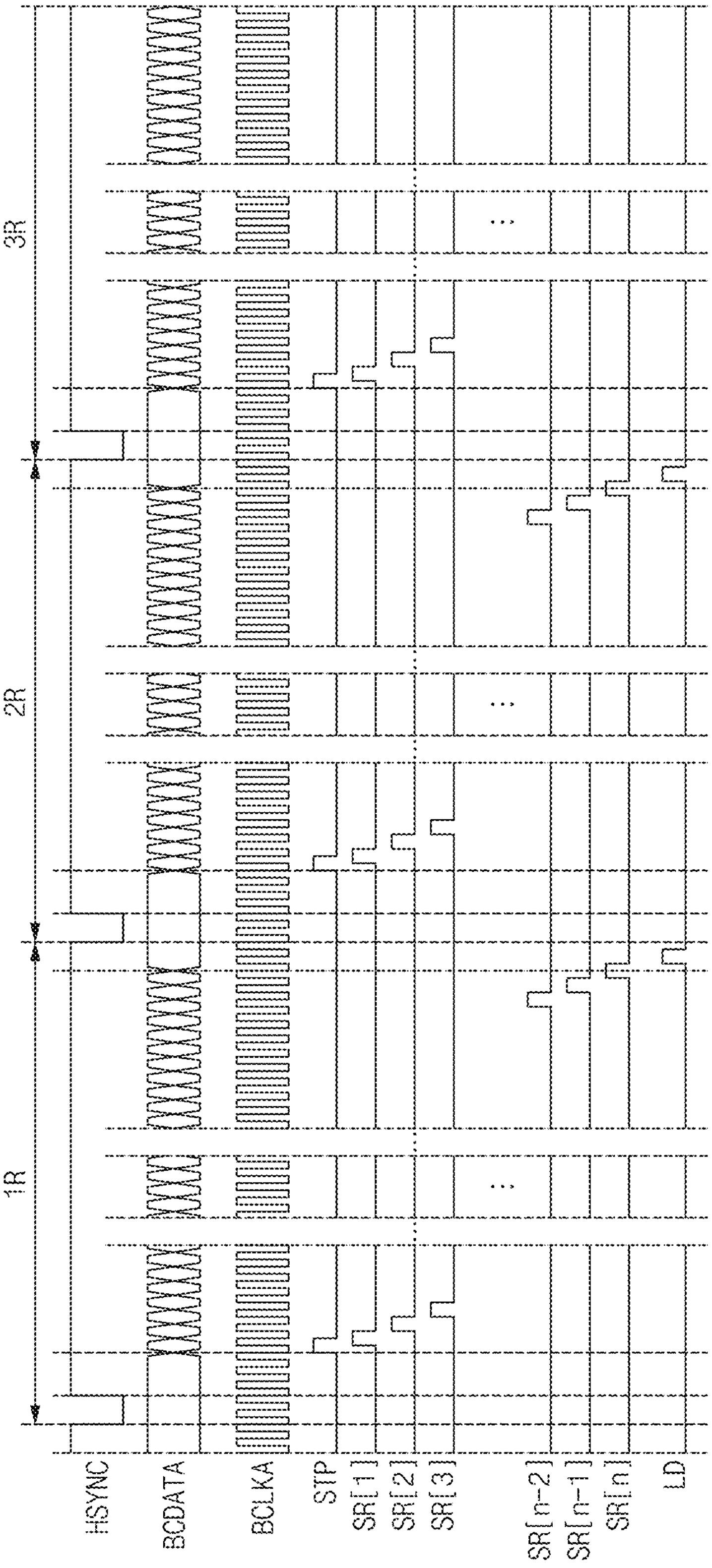
FIG. 7 is a signal timing diagram illustrating signals of a block control driver of FIG. 6.

FIG. 6 is a circuit diagram illustrating an embodiment of a block control driver 600 of FIG. 1. FIG. 7 is a signal timing diagram illustrating signals of a block control driver 600A of FIG. 6.

Referring to FIG. 1 to FIG. 7, an embodiment of a block control driver 600A may include a block control signal convertor 610A and a block control signal outputter 630A.

The block control signal convertor 610A may include a sequential block signal converting block 611A and a sampling block 612A. The sequential block signal converting block 611A may receive a block clock signal BCLKA and the block start signal STP. The sequential block signal converting block 611A may output sequential block signals SR[1], SR[2], SR[3], SR[4], SR[5], . . . based on the block clock signal BCLKA and the block start signal STP.

The sequential block signal converting block 611A may include first latch circuits. A first latch circuit may include an input terminal D that receives the block start signal STP, a clock terminal CK that receives the block clock signal BCLKA and an output terminal Q that outputs a sequential block signal. In an embodiment, the input terminal D of the first latch circuit may receive a previous sequential block signal SR[n−1]. In an embodiment, for example, where the display panel includes the first to N-th pixel-columns PX-C[1], PX-C[2], PX-C[3], PX-C[4], PX-C[5], PX-C[6] to PX-C[n], sequential block signal converting block 611A may include N first latch circuits, that is, the number of the first latch circuits may be N. Accordingly, the sequential block signals SR[1], SR[2], SR[3], SR[4], SR[5], . . . may be outputted. In an embodiment, for example, the sequential block signal converting block 611A may sequentially output sequential block signals SR[1], SR[2], SR[3], SR[4], SR[5], . . . to the sampling block 612A. In an embodiment, for example, the first latch circuit may be a data latch (D-latch) circuit. However, the invention is not limited to a structure of the first latch circuit. In another embodiment, for example, the sequential block signal converting block 611A may be configured as a shift-register.

The sampling block 612A may include second latch circuits. A second latch circuit may include an input terminal D that receives the block control data BCDATA, a clock terminal CK that receives the sequential block signal and an output terminal Q that outputs converted block data. The second latch circuit may convert the block control data BCDATA to the converted block data based on the sequential block signal. In an embodiment, for example, the second latch circuit may convert the block control data BCDATA which are serial data to converted block data CDATA[1], CDATA[2], CDATA[3], CDATA[4], CDATA[5], . . . which are parallel-data based on the sequential block signal. Accordingly, the converted block data CDATA[1], CDATA[2], CDATA[3], CDATA[4], CDATA[5], . . . may be parallel-data. In an embodiment, for example, the second latch circuit may be a D-latch circuit. However, the invention is not limited to a structure of the second latch circuit.

The block control signal outputter 630A may include third latch circuits. A third latch circuit may include an input terminal D that receives the converted block data, a clock terminal CK that receives a block output signal LD and an output terminal Q that outputs a block control signal BC. The third latch circuit may output the block control signal BC.

In an embodiment, for example, when the block output signal LD has an inactivation level in a first period R1, the block control signal outputter 630A may output block control signals BC[1], BC[2], BC[3], BC[4], BC[5], . . . applied to the first pixel-row. In an embodiment, for example, when the block output signal LD has an activation level in the first period R1, block control signals BC[1], BC[2], BC[3], BC[4], BC[5], . . . applied to the second pixel-row may be stored.

In an embodiment, for example, when the block output signal LD has an inactivation level in a second period R2 following to the first period R1, the block control signal outputter 630A may output block control signals BC[1], BC[2], BC[3], BC[4], BC[5], . . . applied to the second pixel-row. In an embodiment, for example, when the block output signal LD has an activation level in the second period R2, block control signals BC[1], BC[2], BC[3], BC[4], BC[5], . . . applied to the third pixel-row may be stored.

In an embodiment, for example, when the block output signal LD has an inactivation level in a third period R3 following to the second period R2, the block control signal outputter 630A may output block control signals BC[1], BC[2], BC[3], BC[4], BC[5], . . . applied to the third pixel-row. In an embodiment, for example, when the block output signal LD has an activation level in the third period R2, block control signals BC[1], BC[2], BC[3], BC[4], BC[5], . . . applied to the fourth pixel-row may be stored.

In an embodiment, as shown in FIG. 7, the block control driver 600A may generate the block control signal CB based on the horizontal start signal HSYNC. The block control signal LD may be synchronized to the horizontal start signal HSYNC. In an embodiment, for example, after the block output signal has an inactivation level from an activation level, the horizontal start signal has an activation level.

Figure 8:
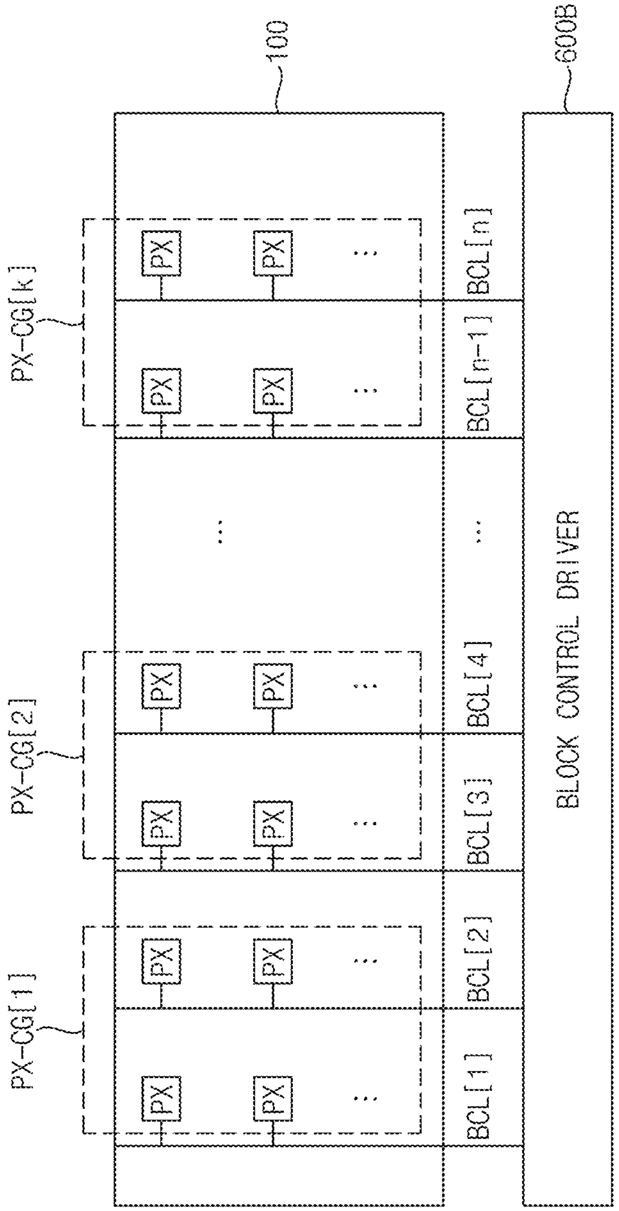
FIG. 8 is a block diagram illustrating a display panel and a block control driver of FIG. 1.

FIG. 8 is a block diagram illustrating a display panel 100 and a block control driver 600 of FIG. 1.

Referring to FIG. 1 to FIG. 4 and FIG. 8, an embodiment of the display panel 100 may include first to K-th pixel-column groups PX-CG[1], PX-CG[2] and PX-CG[k]. Herein, K is a positive integer and smaller than the N. The pixel-column group PX-CG[k] may be a group which includes pixel-columns. The pixel-column may be the pixel circuits PX which is commonly connected to a corresponding one of the block control lines BCL[1], BCL[2], BCL[3], BCL[4], BCL[5], BCL[6] to BCL[n]. However, the invention is not limited to the number of pixel-columns included in the pixel-column group PX-CG[k]. Additionally, the invention is not limited to the number of the pixel-column group PX-CG[k].

Figure 9:
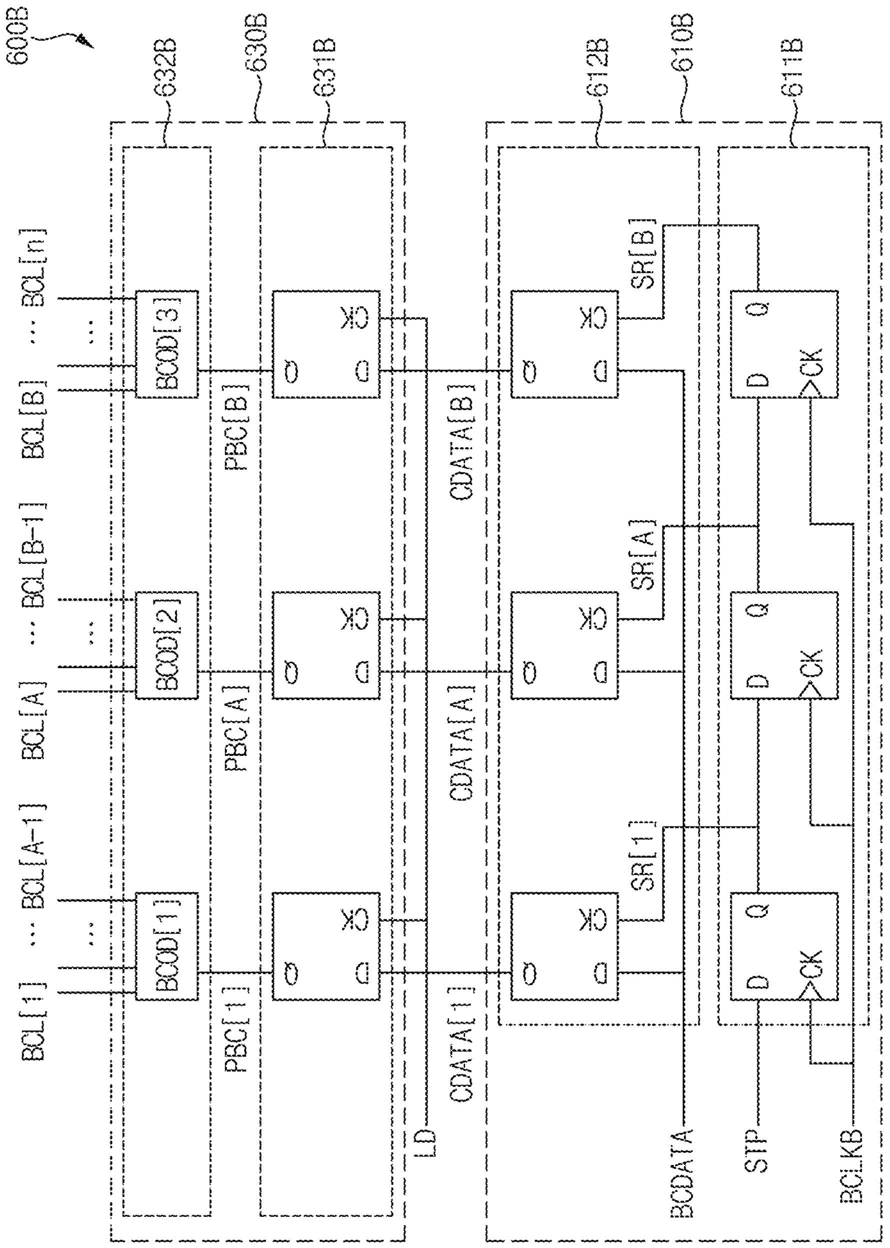
FIG. 9 is a circuit diagram illustrating an embodiment of a block control driver of FIG. 1.
Figure 10:
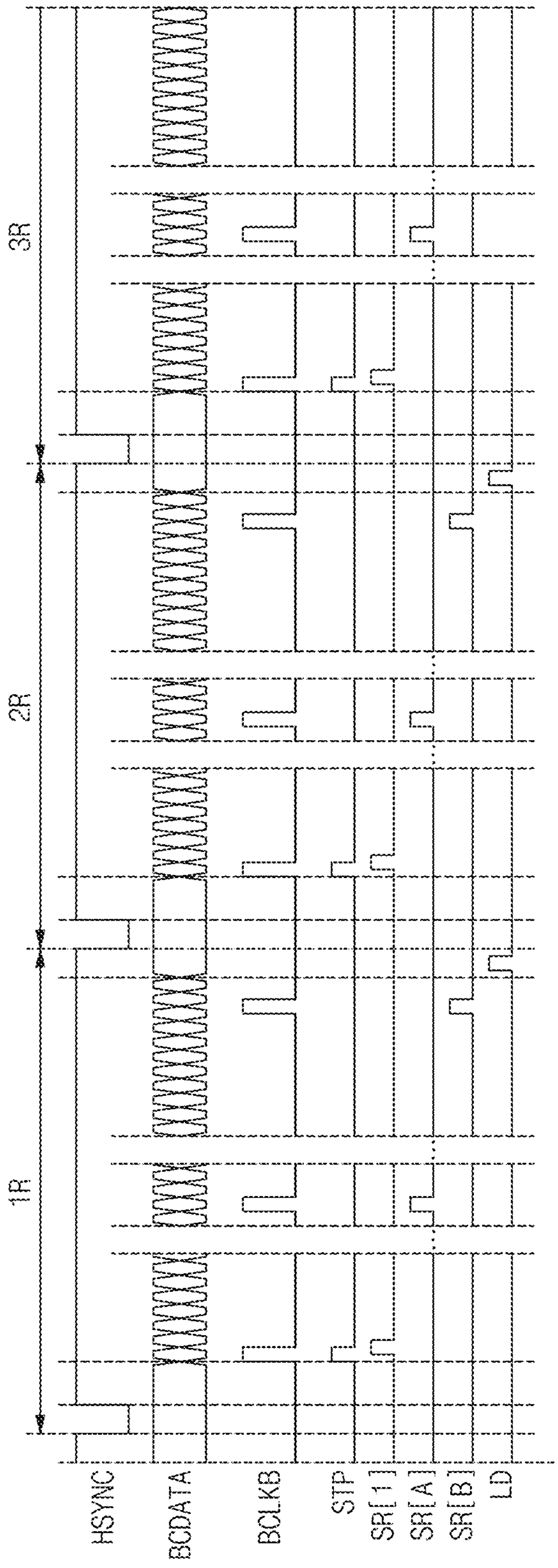
FIG. 10 is a signal timing diagram illustrating signals of a block control driver of FIG. 6.

FIG. 9 is a circuit diagram illustrating an embodiment of a block control driver 600 of FIG. 1. FIG. 10 is a signal timing diagram illustrating signals of a block control driver 600B of FIG. 6.

Referring to FIG. 1 to FIG. 5 and FIG. 8 to FIG. 10, an embodiment of a block control driver 600B may include a block control signal convertor 610B and a block control signal outputter 630B.

The block control signal convertor 610B may include a sequential block signal converting block 611B and a sampling block 612B. The sequential block signal converting block 611B may receive a block clock signal BCLKB and the block start signal STP. The sequential block signal converting block 611B may output sequential block signals SR[1], SR[A] and SR[B] based on the block clock signal BCLKB and the block start signal STP.

The sequential block signal converting block 611B may include first latch circuits. A first latch circuit may include an input terminal D that receives the block start signal STP, a clock terminal CK that receives the block clock signal BCLKB and an output terminal Q that outputs a sequential block signal. In an embodiment, the input circuit of the first latch circuit may receive a previous sequential block signal SR[A]. In an embodiment, for example, where the display panel includes the first to K-th pixel-column groups PX-CG[1], PX-CG[2] and PX-CG[k], sequential block signal converting block 611B may include K first latch circuits. Accordingly, the first to K-th sequential block signals SR[1], SR[A] and SR[B] may be outputted. In an embodiment, for example, where the display panel includes the first to third pixel-column groups, sequential block signal converting block 611B may include 3 first latch circuits. In an embodiment, for example, the sequential block signal converting block 611B may sequentially output the sequential block signals SR[1], SR[A] and SR[B] to the sampling block 612B. In an embodiment, for example, the sequential block signal converting block 611B may sequentially output a first sequential block signal SR[1], a second sequential block signal SR[A] and a third sequential block signal SR[B] to the sampling block 612B. In an embodiment, for example, the first latch circuit may be a D-latch. However, the invention is not limited to a structure of the first latch circuit. In another embodiment, for example, the sequential block signal converting block 611B may be configured as a shift-register.

The sampling block 612B may include second latch circuits. A second latch circuit may include an input terminal D that receives the block control data BCDATA, a clock terminal CK that receives the sequential block signal and an output terminal Q that outputs converted block data. The second latch circuit may convert the block control data BCDATA to the converted block data based on the sequential block signal. In an embodiment, for example, the sampling block 612B may convert the block control data BCDATA which are serial data to converted block data CDATA[1], CDATA[A] and CDATA[B] which are parallel-data based on the sequential block signal. Accordingly, the converted block data CDATA[1], CDATA[A] and CDATA[B] may be parallel-data. In an embodiment, for example, the second latch circuit may be a D-latch. However, the invention is not limited to a structure of the second latch circuit.

The block control signal outputter 630B may include a holding block 631B and an outputting block 632B. The holding block 631B may include third latch circuits. The outputting block 632B may include a first group outputting block BCOD[1], a second group outputting block BCOD[2] and a third group outputting block BCOD[3].

A third latch circuit may include an input terminal D that receives the converted block data, a clock terminal CK that receives a block output signal LD and an output terminal Q that outputs a group block control signal. The holding block 631B may output group block control signals PBC[1], PBC[A] and PBC[B].

In an embodiment, for example, when the block output signal LD has an inactivation level in a first period R1, the block control driver 600B may output group block control signals PBC[1], PBC[A] and PBC[B] applied to the first pixel-row. In an embodiment, for example, when the block output signal LD has an activation level in the first period R1, group block control signals PBC[1], PBC[A] and PBC[B] applied to the second pixel-row may be stored.

In an embodiment, for example, when the block output signal LD has an inactivation level in a second period R2 following to the first period R1, the block control driver 600B may output group block control signals PBC[1], PBC[A] and PBC[B] applied to the second pixel-row. In an embodiment, for example, when the block output signal LD has an activation level in the second period R2, group block control signals PBC[1], PBC[A] and PBC[B] applied to the third pixel-row may be stored.

In an embodiment, for example, when the block output signal LD has an inactivation level in a third period R3 following to the second period R2, the block control driver 600B may output group block control signals PBC[1], PBC[A] and PBC[B] applied to the third pixel-row. In an embodiment, for example, when the block output signal LD has an activation level in the third period R2, group block control signals PBC[1], PBC[A] and PBC[B] applied to the fourth pixel-row may be stored.

In an embodiment, the block control driver 600B may generate the group block control signals PBC[1], PBC[A] and PBC[B] based on the horizontal start signal HSYNC. The block control signal LD may be synchronized to the horizontal start signal HSYNC. In an embodiment, for example, after the block output signal has an inactivation level from an activation level, the horizontal start signal has an activation level.

In an embodiment, the first group block control signal PBC[1] may be outputted to the first pixel-column group PX-CG[1]. The second group block control signal PBC[2] may be outputted to the second pixel-column group PX-CG[2]. The third group block control signal PBC[3] may be outputted to the third pixel-column group PX-CG[3]. In an embodiment, for example, the first group outputting block BCOD[1] may be connected to first group block control lines BCL[1] to BCL[A−1] which are connected to the first pixel-column group PX-CG[1]. The first group outputting block BCOD[1] may output the first group block control signal PBC[1] to the first group block control lines BCL[1] to BCL[A−1]. In an embodiment, for example, the second group outputting block BCOD[2] may be connected to second group block control lines BCL[A] to BCL[B−1] which are connected to the second pixel-column group PX-CG[2]. The third group outputting block BCOD[3] may output the third group block control signal PBC[3] to the third group block control lines BCL[B] to BCL[n].

In an embodiment, a group block control signal may be outputted to group block control lines. Accordingly, the number of the first latch circuits, the number of the second latch circuits and the number of the third latch circuits may be reduced. Accordingly, a power consumption of the display apparatus 1 may be reduced. Additionally, a frequency of the block clock signal BCLKB may be reduced. The frequency of the block clock signal BCLKB may be reduced, such that a power consumption of the display apparatus 1 may be further reduced.

Figure 11:
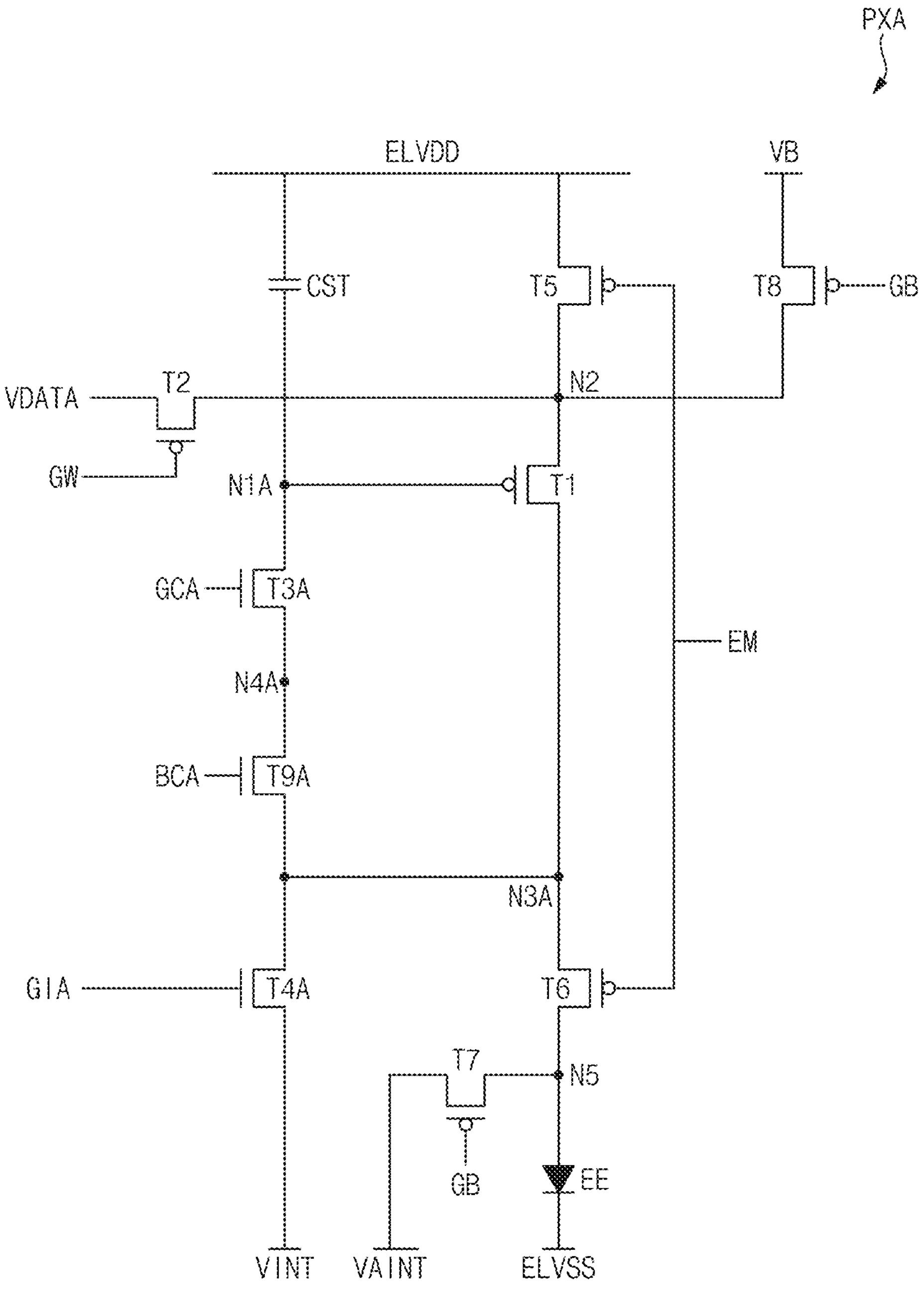
FIG. 11 is a circuit diagram illustrating an embodiment of a pixel circuit of FIG. 1.

FIG. 11 is a circuit diagram illustrating an embodiment of a pixel circuit PX of FIG. 1.

Referring to FIG. 1 to FIG. 11, an embodiment of a pixel circuit PXA may include a first transistor T1, a second transistor T2, a third transistor T3A, a fourth transistor T4A, a fifth transistor T5, a sixth transistor T6, a seventh transistor T7, an eighth transistor T8, a ninth transistor T9A, a storage capacitor CST and a light emitting element EE.

The first transistor T1 may include a control electrode connected to a first node NIA, a first electrode connected to a second node N2 and a second electrode connected to a third node N3A. The first transistor T1 may generate a driving current based on a voltage of the first node NIA. In an embodiment, for example, the first transistor T1 may be called as a driving transistor.

The second transistor T2 may include a control electrode that receives the write gate signal GW, a first electrode that receives the data voltage VDATA and a second electrode connected to the second node N2. The second transistor T2 may apply the data voltage VDATA to the second node N2 in response to the write gate signal GW. In an embodiment, for example, an operation that the second transistor T2 applies the data voltage VDATA may be called as a writing operation. In an embodiment, for example, the second transistor T2 may be called as a writing transistor.

The third transistor T3A may include a control electrode that receives the compensation gate signal GC, a first electrode connected a fourth node N4A and a second electrode connected to the first node NIA. The third transistor T3A may connect the fourth node N4A and the first node NIA in response to the compensation gate signal GC. In an embodiment, for example, the third transistor T3A may be called a compensation transistor.

The fourth transistor T4A may include a control electrode that receives the initialization gate signal GIA, a first electrode that receives the initialization voltage VINT and a second electrode connected to the third node N3A. The fourth transistor T4A may apply the initialization voltage VINT to the third node N3A in response to the initialization gate signal GIA. In an embodiment, for example, an operation that the initialization voltage is applied to the first node NIA may be called as an initialization operation. In an embodiment, for example, the fourth transistor T4A may be called as an initialization transistor.

The fifth transistor T5 may include a control electrode that receives the emission signal EM, a first electrode that receives a first power voltage ELVDD and a second electrode connected to the second node N2. The fifth transistor T5 may apply the first power voltage ELVDD to the second node N2 in response to the emission signal EM. In an embodiment, for example, the fifth transistor T5 may be called as a first emission transistor.

The sixth transistor T6 may include a control electrode that receives the emission signal EM, a first electrode connected to the third node N3A and a second electrode connected to a fifth node N5. The sixth transistor T6 may connect the third node N3 and the fifth node N5 in response to the emission signal EM. The sixth transistor T6 may output the driving current in response to the emission signal EM. In an embodiment, for example, the sixth transistor T6 may be called as a second emission transistor.

The seventh transistor T7 may include a control electrode that receives the bias gate signal GB, a first electrode that receives a light emitting element initialization voltage VAINT and a second electrode connected to the fifth node N5. The seventh transistor T7 may apply the light emitting element initialization voltage VAINT to the fifth node N5 in response to the bias gate signal GB. The light emitting element initialization voltage VAINT may be lower than a second power voltage ELVSS. The light emitting element initialization voltage VAINT may be lower than a second power voltage ELVSS, such that a black characteristic of the pixel circuit PXA may be improved. In an embodiment, for example, the seventh transistor T7 may be called as a light emitting element initialization transistor.

The eighth transistor T8 may include a control electrode that receives the bias gate signal GB, a first electrode that receives a bias voltage VB and a second electrode connected to the second node N2. The eighth transistor T8 may apply the bias voltage VB to the second node N2 in response to the bias gate signal GB. In an embodiment, for example, the eighth transistor T8 may be called as a bias transistor.

The ninth transistor T9A may include a control electrode that receives the block control signal BCA, a first electrode connected to the third node N3A and a second electrode connected to the fourth node N4A. The ninth transistor T9A may connect the third node N3A and the fourth node N4A in response to the block control signal BCA. In an embodiment, for example, the ninth transistor T9A may be called as a block control transistor.

The storage capacitor CST may include a control electrode that receives the first power voltage ELVDD and a second electrode connected to the first node NIA.

The light emitting element EE may include a first electrode connected to the fifth node N5 and a second electrode that receives the second power voltage ELVSS. The light emitting element EE may emit light based on the driving current.

In an embodiment, for example, when the block control signal BCA has an activation level, the ninth transistor T9A may be turned on. In an embodiment, the activation level of the block control signal BCA may be a high level H.

In an embodiment, for example, when the block control signal BCA has an inactivation level, the ninth transistor T9A may be turned off. In an embodiment, the inactivation level of the block control signal BCA may be a low level L.

The pixel circuit PXA may emit light with a high frequency (e.g., about 120 Hz) for a region within the display panel 100 by high-frequency driving, and may emit light with a low frequency (e.g., about 1 Hz) for a region within the display panel 100 by low-frequency driving, based on a block control signal BCA.

In an embodiment, for example, when the display panel 100 emits light as the high frequency, the block control signal BCA may have an activation level and the ninth transistor T9A may be turned on. The ninth transistor T9A may be turned on, such that a voltage of the first node NIA may be initialized and the writing operation may be performed. Accordingly, the pixel circuit PXA may emit light based on a data voltage of the present frame.

In an embodiment, for example, when the display panel 100 emits light as the low frequency, the block control signal BCA may have an inactivation level and the ninth transistor T9A may be turned off. The ninth transistor T9A may be turned off, such that a voltage of the first node NIA may be maintained. Accordingly, the pixel circuit PXA emit light based on a data voltage of a previous frame.

In an embodiment, the pixel may include a transistor of a first type and a transistor of a second type different from the first type. In an embodiment, for example, the transistor of the first type may be a polysilicon thin film transistor. In an embodiment, for example, the transistor of the first type may be a low temperature polysilicon (LTPS) thin film transistor. In an embodiment, for example, the transistor of the second type may be an oxide thin film transistor. In an embodiment, for example, the transistor of the first type may be a P-type transistor and the transistor of the second type may be an N-type transistor.

Although some of the transistors of the pixel are the oxide thin film transistors and other transistor of the pixel are the polysilicon thin film transistors in an embodiment, the invention may not be limited thereto. In another embodiment of the invention, the pixel may include only the oxide thin film transistors.

Although some of the transistors of the pixel are the N-type transistors and other transistors of pixel are the P-type transistors in an embodiment, the invention may not be limited thereto. In another embodiment of the invention, the pixel may include only the N-type transistors. In another embodiment of the invention, the pixel may include only the P-type transistors.

In an embodiment, the first transistor T1, the second transistor T2, the fifth transistor T5, the sixth transistor T6, the seventh transistor T7 and the eighth transistor T8 may be P-type transistors. In such an embodiment, the third transistor T3A, the fourth transistor T4A and the ninth transistor T9A may be N-type transistors.

However, the invention is not limited to a structure of the pixel circuit PXA.

Figure 12:
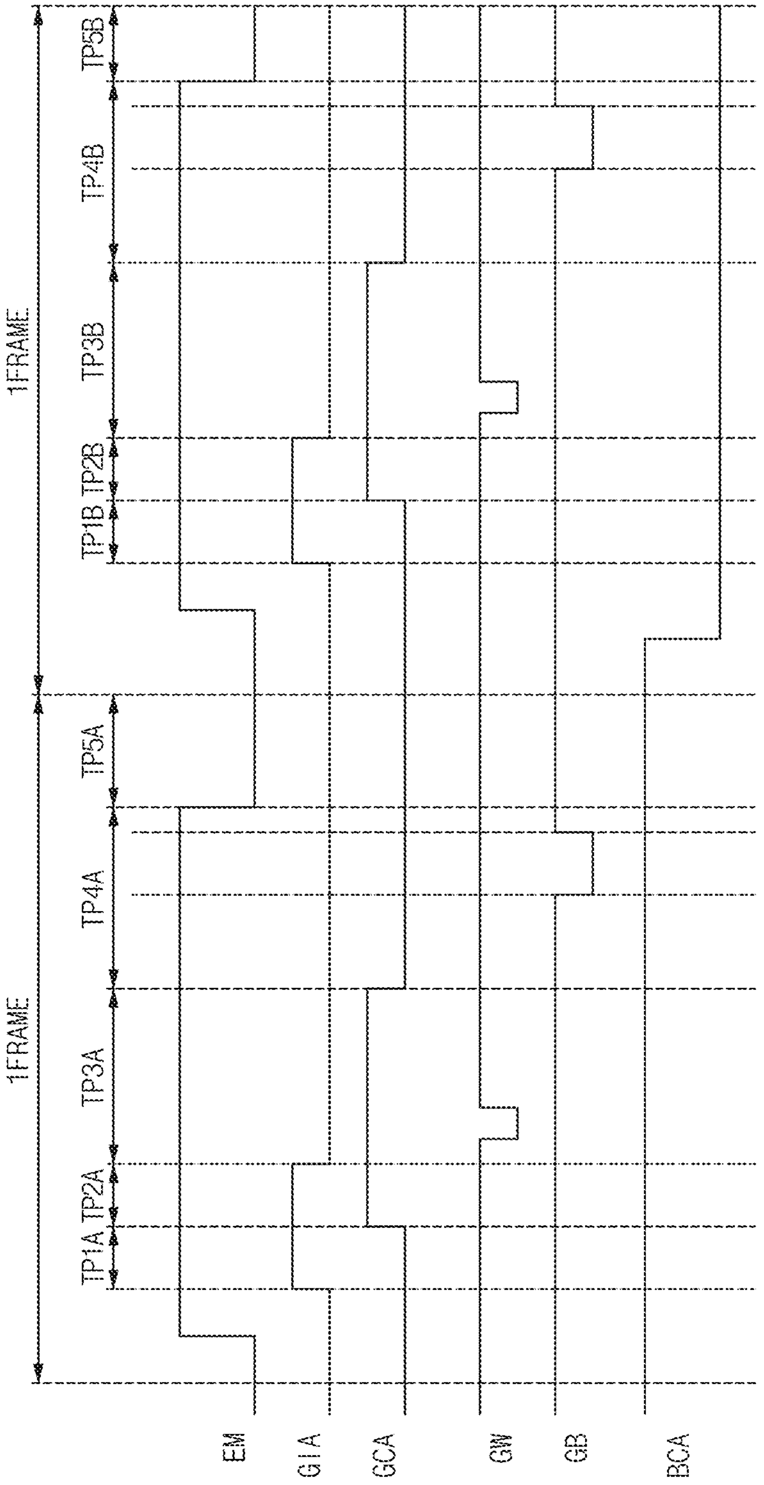
FIG. 12 is a signal timing diagram illustrating signals applied to a pixel circuit of FIG. 11.

FIG. 12 is a signal timing diagram illustrating signals applied to a pixel circuit PXA of FIG. 11.

Referring to FIG. 1 to FIG. 12, a period in which the pixel circuit PXA is driven may include an address period and a self-scan period.

In the address period, the initialization operation and the writing operation may be performed. In the address period, the pixel circuit PXA may emit light based on a data voltage of a present frame. In the self-scan period, the initialization operation and the writing operation may not be performed. In the self-scan period, the pixel circuit PXA may emit light based on a data voltage of a previous frame.

The address period may include a first period TP1A, a second period TP2A, a third period TP3A, a fourth period TP4A and a fifth period TP5A.

In the first period TP1A, the initialization gate signal GIA may have an activation level, the compensation gate signal GC may have an inactivation level, the write gate signal GW may have an inactivation level and the block control signal BCA may have an activation level. In the first period TP1A, the fourth transistor T4A and the ninth transistor T9A may be turned on. Accordingly, the initialization voltage VINT may be applied to the fourth node N4.

In the second period TP2A, the initialization gate signal GIA may have an activation level, the compensation gate signal GC may have an activation level, the write gate signal GW may have an activation level and the block control signal BCA may have an activation level. In the second period TP2A, the third transistor T3A, the fourth transistor T4A and the ninth transistor T9A may be turned on. Accordingly, the initialization voltage VINT may be applied to the first node NIA. Accordingly, a voltage of the first node NA may be initialized as the initialization voltage VINT. In an embodiment, for example, the second period TP2A may be called as a first initialization period.

In the third period TP3A, the initialization gate signal GIA may have an inactivation level, the compensation gate signal GC may have an activation level, the write gate signal GW may have an activation level and the block control signal BCA may have an activation level. In the third period TP3A, the second transistor T2 may be turned on in response to the write gate signal GW. The second transistor T2 may be turned on, such that the data voltage VDATA may be applied to the second node N2. In the third period TP3A, the third transistor T3A may be turned on in response to the compensation gate signal GC. In the third period TP3A, the ninth transistor T9A may be turned on in response to the block control signal BCA. The third transistor T3A and the ninth transistor T9A may diode-connect the first transistor T1. Accordingly, a voltage considering the data voltage VDATA and a threshold voltage of the first transistor T1 may be applied to the first node NIA. In an embodiment, for example, the voltage considering the data voltage VDATA and a threshold voltage of the first transistor T1 may be called as a compensation data voltage. In an embodiment, for example, the third period TP3A may be called as a first writing period.

In the fourth period TP4A, the initialization gate signal GIA may have an inactivation level, the compensation gate signal GC may have an inactivation level, the write gate signal GW may have an inactivation level and the bias gate signal GB may have an activation level. In the fourth period TP4A, the seventh transistor T7 and the eighth transistor T8 may be turned on in response to the bias gate signal GB. The seventh transistor T7 may be turned on, such that the light emitting element initialization voltage VAINT may be applied to the fifth node N5. The eighth transistor T8 may be turned on, such that the bias voltage VB may be applied to the second node N2.

In the first to fourth periods TP1A, TP2A, TP3A and TP4A, the emission signal EM may have an inactivation level. In the first to fourth periods TP1A, TP2A, TP3A and TP4A, the fifth transistor T5 and the sixth transistor T6 may be turned off in response to the emission signal EM. Accordingly, the pixel circuit PXA may not emit light.

In the fourth period TP4A, the initialization gate signal GIA may have an inactivation level, the compensation gate signal GC may have an inactivation level, the write gate signal GW may have an inactivation level, the bias gate signal GB may have an inactivation level and the emission signal may have an activation level.

In the fifth period TP5A, the fifth transistor T5 and the sixth transistor T6 may be turned on in response to the emission signal EM. Accordingly, the driving current generated based on a data voltage of a present frame may be applied to the light emitting element EE. The pixel circuit PXA may emit light based on a data voltage of a present frame.

The self-scan period may include a first period TP1B, a second period TP2B, a third period TP3B, a fourth period TP4B and a fifth period TP5B.

In the first period TP1B, the initialization gate signal GIA may have an activation level, the compensation gate signal GC may have an inactivation level, the write gate signal GW may have an inactivation level and the block control signal BCA may have an inactivation level. In the first period TP1B, the ninth transistor T9A may be turned off in response to the block control signal BCA. Accordingly, a voltage of the first node NIA may be maintained.

In the second period TP2B, the initialization gate signal GIA may have an activation level, the compensation gate signal GC may have an activation level, the write gate signal GW may have an activation level and the block control signal BCA may have an inactivation level. In the second period TP2B, the ninth transistor T9A may be turned off in response to the block control signal BCA. Accordingly, a voltage of the first node NIA may be maintained. In an embodiment, for example, the second period TP2B may be called as a second initialization period.

In the third period TP3B, the initialization gate signal GIA may have an inactivation level, the compensation gate signal GC may have an activation level, the write gate signal GW may have an activation level and the block control signal BCA may have an inactivation level. In the third period TP3B, the ninth transistor T9A may be turned off in response to the block control signal BCA. Accordingly, a voltage of the first node NIA may be maintained. In an embodiment, for example, the third period TP3B may be called as s second initialization period.

In the fourth period TP4B, the initialization gate signal GIA may have an inactivation level, the compensation gate signal GC may have an inactivation level, the write gate signal GW may have an inactivation level and the bias gate signal GB may have an activation level. In the fourth period TP4B, the seventh transistor T7 and the eighth transistor T8 may be turned on in response to the bias gate signal GB. The seventh transistor T7 may be turned on, such that the light emitting element initialization voltage VAINT may be applied to the fifth node N5. The eighth transistor T8 may be turned on, such that the bias voltage VB may be applied to the second node N2.

In the first to fourth periods TP1B, TP2B, TP3B and TP4B, the emission signal EM may have an inactivation level. In the first to fourth periods TP1B, TP2B, TP3B and TP4B, the fifth transistor T5 and the sixth transistor T6 may be turned off in response to the emission signal EM. Accordingly, the pixel circuit PXA may not emit light.

In the fourth period TP4B, the initialization gate signal GIA may have an inactivation level, the compensation gate signal GC may have an inactivation level, the write gate signal GW may have an inactivation level, the bias gate signal GB may have an inactivation level and the emission signal may have an activation level.

In the fifth period TP5B, the fifth transistor T5 and the sixth transistor T6 may be turned on in response to the emission signal EM. Accordingly, the driving current generated based on a data voltage of a previous frame may be applied to the light emitting element EE. The pixel circuit PXA may emit light based on a data voltage of a previous frame.

In the self-scan period, the block control signal BCA may have an inactivation level. In the self-scan period, the ninth transistor T9A may be turned off in response to the block control signal BCA. In the self-scan period, the ninth transistor T9A may be turned off, such that the voltage of the first node NA may be maintained. In an embodiment, for example, the voltage of the first node NIA may be maintained as a data voltage of a previous frame in the self-scan period.

Figure 13:
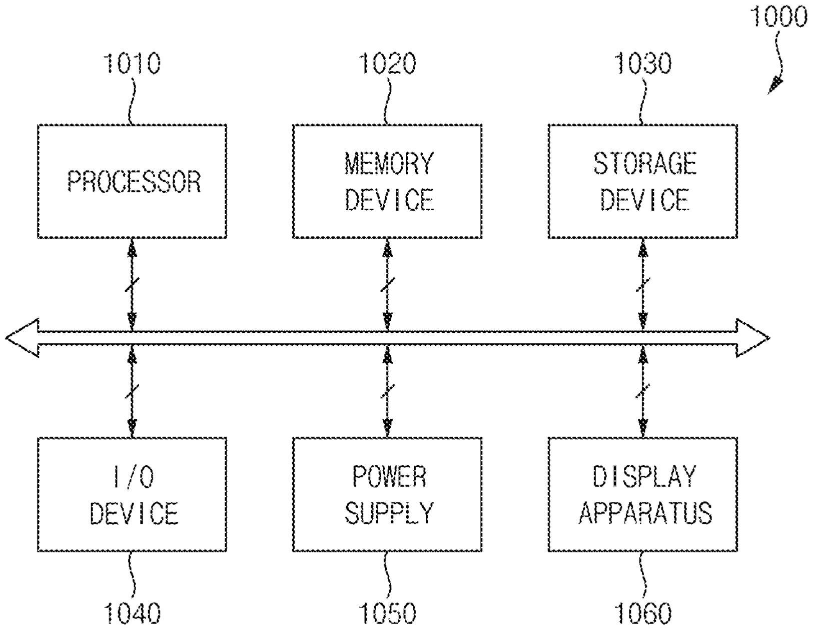
FIG. 13 is a block diagram illustrating an electronic apparatus according to an embodiment of the invention.
Figure 14:
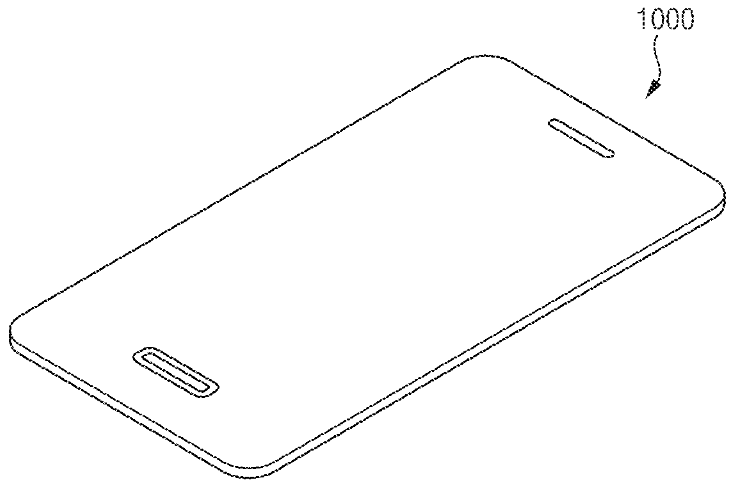
FIG. 14 is a diagram illustrating an embodiment in which the electronic apparatus of FIG. 13 is implemented as a smart phone.

FIG. 13 is a block diagram illustrating an electronic apparatus 1000 according to an embodiment of the invention. FIG. 14 is a diagram illustrating an embodiment in which the electronic apparatus of FIG. 13 is implemented as a smart phone.

Referring to FIG. 13, an embodiment of the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. Additionally, the electronic apparatus 1000 may further include a plurality of ports for communicating with a video card, a sound card, a memory card, a universal serial bus (USB) device, other electronic apparatus, etc.

In an embodiment, as illustrated in FIG. 14, the electronic apparatus 1000 may be implemented as a smart phone. However, the electronic apparatus 1000 is not limited thereto. In an embodiment, for example, the electronic apparatus 1000 may be implemented as a cellular phone, a video phone, a smart pad, a smart watch, a tablet computer, a car navigation system, a computer monitor, a laptop, a head mounted display (HMD) device, or the like.

The processor 1010 may perform various computing functions or various tasks. The processor 1010 may be a micro-processor, a central processing unit (CPU), an application processor (AP), or the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG, the app-on signal APPON and the input control signal CONT to the driving controller 200 of FIG. 1.

The memory device 1020 may store data for operations of the electronic apparatus 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like. The I/O device 1040 may include an input device such as a keyboard, a keypad, a mouse device, a touch-pad, a touch-screen, and or like and an output device such as a printer, a speaker, or the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Referring to FIG. 14, in an embodiment, the electronic apparatus of the invention may be implemented as a smartphone, but the invention is not limited thereto. The electronic apparatus may be a television, a monitor, a laptop computer, or a tablet. Additionally, the electronic apparatus may be a vehicle or an automobile.

The display apparatus according to embodiments may be applied to a display apparatus included in various portable electronic devices such as a computer, a notebook, a mobile phone, a smart phone, a smart pad, a personal media player (PMP), a portable digital assistant (PDA), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display apparatus comprising:
   a display panel including a first display region and a second display region;

a gate emission driver which outputs gate signals to the display panel;

a data driver which applies a data voltage to the display panel; and a block control driver which outputs block control signals to the display panel based on block control data, wherein a driving frequency of the first display region is determined independently of a driving frequency of the second display region based on the block control signals, and wherein the block control driver receives the block control data sequentially, and outputs the block control signals in parallel.

2. The display apparatus of claim 1, wherein the display panel includes first to N-th block control lines, which output first to N-th block control signals, respectively, and first to N-th pixel-column, wherein the first to N-th block control lines are connected to the first to N-th pixel-column, respectively, and wherein N is a positive integer.

3. The display apparatus of claim 1, wherein the block control driver includes:

a block control signal convertor which receives the block control data and a block clock signal, and outputs converted block data based on the block control data and the block clock signal; and a block control signal outputter which receives the converted block data and outputs the block control signals based on block output signal.

4. The display apparatus of claim 3, wherein the data driver generates the data voltage based on a horizontal start signal, wherein the block control driver generates the block control signals based on the horizontal start signal, and wherein the block output signal is synchronized to the horizontal start signal.

5. The display apparatus of claim 4, wherein after the block output signal has an inactivation level from an activation level, the horizontal start signal has an activation level.

6. The display apparatus of claim 3, wherein the block control signal convertor includes:

a sequential block signal converting block which receives a block start signal and the block clock signal, and outputs a sequential block signal based on the block start signal and the block clock signal; and a sampling block which outputs the converted block data based on the block control data and the sequential block signal.

7. The display apparatus of claim 6, wherein the block signal converting block includes a first latch circuit, and wherein the first latch circuit includes an input terminal which receives the block start signal, a clock terminal which receives the block clock signal, and an output terminal which outputs the sequential block signal.

8. The display apparatus of claim 6, wherein the sampling block includes a second latch circuit, and wherein the second latch circuit includes an input terminal which receives the block control data, a clock terminal which receives the sequential block signal, and an output terminal which outputs the converted block data.

9. The display apparatus of claim 6, wherein the block control signal outputter includes a third latch circuit, and wherein the third latch circuit includes an input terminal which receives the converted block data, a clock terminal which receives the block output signal, and an output terminal which outputs the block control signals.

10. The display apparatus of claim 1, wherein the display panel includes a first pixel-column group, a second pixel-column group and a third pixel-column group, wherein the block control signals include a first group block control signal, a second group block control signal and a third group block control signal, wherein the first group block control signal is outputted to the first pixel-column group, wherein the second group block control signal is outputted to the second pixel-column group, wherein the third group block control signal is outputted to the third pixel-column group, and wherein the block control driver includes:

a sequential block signal converting block which receives a block start signal and a block clock signal, and outputs a sequential block signal based on the block start signal and the block clock signal;

a sampling block which outputs the converted block data based on the block control data and the sequential block signal;

a holding block which receives the converted block data, and generates the first group block control signal, the second group block control signal and the third group block control signal based on a block output signal; and an output block which outputs the first group block control signal to a first pixel-column, outputs the second group block control signal to a second pixel-column, and outputs the third group block control signal to a third pixel-column.

11. The display apparatus of claim 1, wherein the second display region is located adjacent to the first display region in a first direction, and wherein the display panel is located spaced apart from the data driver in a second direction different from the first direction.

12. The display apparatus of claim 1, wherein the display panel includes a gate line which outputs the gate signals, a data line which outputs the data voltage, and a block control line which outputs the block control line, and wherein the gate line extends in a first direction, the data line extends in a second direction different from the first direction, and the block control line extends in the second direction.

13. A display apparatus comprising:

a display panel including a pixel circuit;

a gate emission driver which outputs gate signals to the display panel;

a data driver which applies a data voltage to the display panel; and a block control driver which outputs a block control signal to the display panel based on block control data, wherein the pixel circuit includes:

a driving transistor which generates a driving current based on the data voltage;

a writing transistor which performs a data writing operation by applying the data voltage to the driving transistor in response to a write gate signal;

an initialization transistor which performs an initialization operation by applying an initialization voltage to the driving transistor in response to an initialization gate signal; and a block control transistor which controls the writing operation and the initialization operation in response to the block control signal, wherein the block control driver receives the block control data sequentially, and outputs the block control signal in parallel, and wherein the block control driver converts the block control data sequentially and transfers converted block control data to the display panel simultaneously in response to a block output signal.

14. The display apparatus of claim 13, wherein the block control driver includes:

a block control signal convertor which receives the block control data and a block clock signal, and outputs the converted block data based on the block control data and the block clock signal; and a block control signal outputter which receives the converted block data and outputs the block control signal based on the block output signal.

15. The display apparatus of claim 14, wherein the block control signal convertor includes:

a sequential block signal converting block which receives a block start signal and the block clock signal, and outputs a sequential block signal based on the block start signal and the block clock signal; and a sampling block which outputs the converted block data based on the block control data and the sequential block signal.

16. The display apparatus of claim 15, wherein the block signal converting block includes a first latch circuit, and wherein the first latch circuit includes an input terminal which receives the block start signal, a clock terminal which receives the block clock signal, and an output terminal which outputs the sequential block signal.

17. The display apparatus of claim 15, wherein the sampling block includes a second latch circuit, and wherein the second latch circuit includes an input terminal which receives the block control data, a clock terminal which receives the sequential block signal, and an output terminal which outputs the converted block data.

18. The display apparatus of claim 15, wherein the block control signal outputter includes a third latch circuit, and wherein the third latch circuit includes an input terminal which receives the converted block data, a clock terminal which receives the block output signal, and an output terminal which outputs the block control signal.

19. The display apparatus of claim 13, wherein a period, in which the pixel circuit is driven, includes an address period, in which the pixel circuit emit light based on a data voltage of a present frame, and a self-scan period, in which the pixel circuit emit light based on a data voltage of a previous frame, and wherein in the address period, the block control signal has an activation level, and the block control transistor is turned on.

20. An electronic apparatus comprising:

a display panel including a first display region and a second display region;

a gate emission driver which outputs gate signals to the display panel;

a data driver which applies a data voltage to the display panel;

a block control driver which outputs block control signals to the display panel based on block control data;

a driving controller which controls the gate emission driver, the data driver and the block control driver based on an input control signal; and a processor which outputs the input control signal, wherein a driving frequency of the first display region is determined independently of a driving frequency of the second display region based on the block control signals, and wherein the block control driver receives the block control data sequentially, and outputs the block control signals in parallel.

* * * * *